No. 705,989. Patented July 29, 1902.
W. C. WILSON.
INTERMEDIATE COUPLING.
(Application filed May 26, 1902.)
(No Model.)

Witnesses
Alfred A. Eicker
[signature]

Inventor
Wm. C. Wilson
by Higdon & Longan attys

THE NORRIS PETERS CO., PHOTO-LITHO., WASHINGTON, D. C.

UNITED STATES PATENT OFFICE.

WILLIAM C. WILSON, OF ST. LOUIS, MISSOURI.

INTERMEDIATE COUPLING.

SPECIFICATION forming part of Letters Patent No. 705,989, dated July 29, 1902.

Application filed May 26, 1902. Serial No. 109,099. (No model.)

*To all whom it may concern:*

Be it known that I, WILLIAM C. WILSON, of the city of St. Louis, State of Missouri, have invented certain new and useful Improvements in Intermediate Couplers, of which the following is a full, clear, and exact description, reference being had to the accompanying drawings, forming a part hereof.

My object is to construct an intermediate coupler; and my invention consists of the novel features herein shown, described, and claimed.

Figure 1:
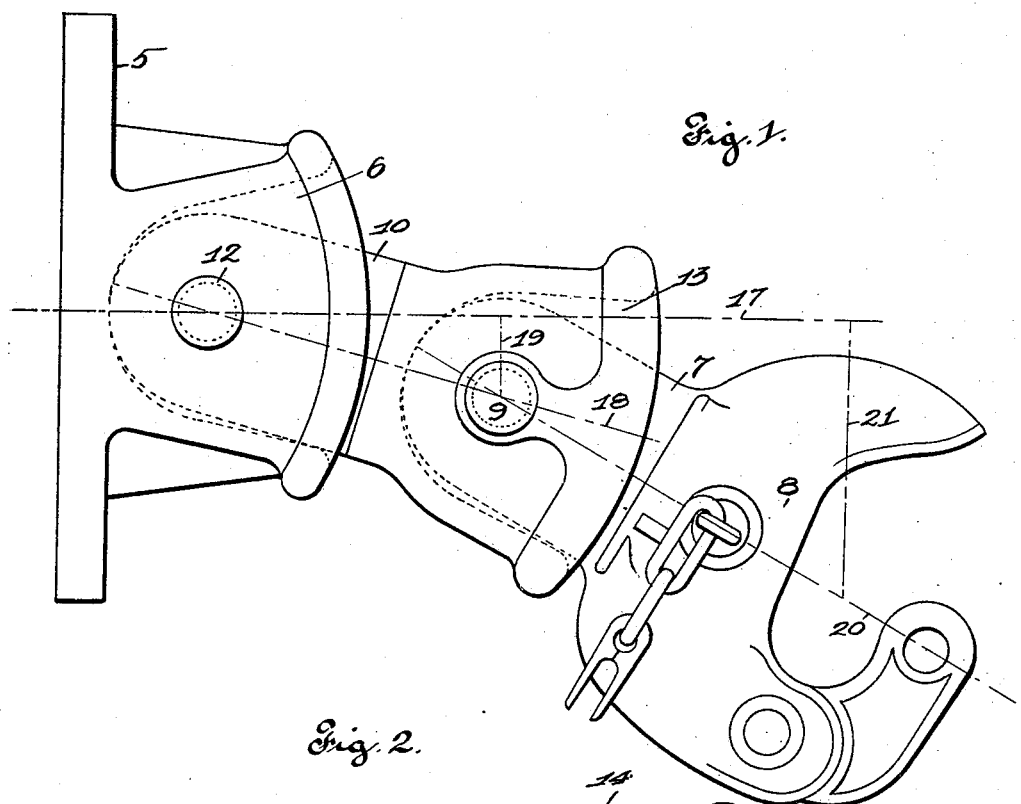
Figure 2:
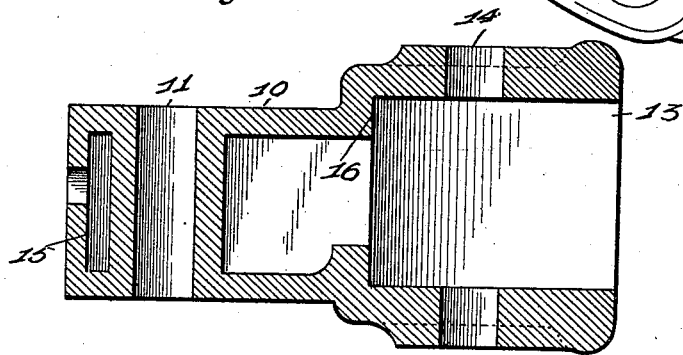
Figure 3:
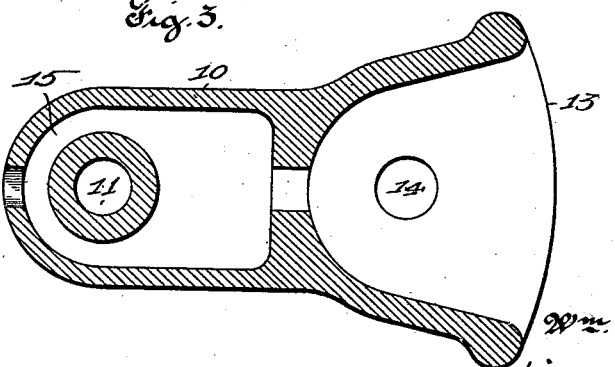

Figure 1 is a top plan view showing my intermediate coupler in position for use. Fig. 2 is a vertical central section of the intermediate coupler. Fig. 3 is a horizontal central section of the intermediate coupler.

Referring to the drawings in detail, in the old construction the flange-plate 5 is adapted to be attached to the end sill of a locomotive-tender or locomotive-fender and has the integral socket 6 to receive the shank 7 of the coupler-head 8, and a pivot-pin 9 is inserted through the socket 6 and shank 7 to pivotally mount the coupler-head. That is the old construction and is defective when applied to locomotives, because it will not allow sufficient swing of the coupler-head to make a coupling between a locomotive and a long car on a sharp curve, and if the coupling is made before the curve is reached there is great danger of derailing the car, breaking a wheel-flange, or doing other damage. My intermediate coupler is intended to overcome these difficulties, and consists of the shank 10, to be inserted into the socket 6 and having a pinhole 11 to receive the pin 12 and the socket 13 to receive the shank 7 and having pinhole 14 to receive the pin 9. The shank 10 is cored, as indicated by 15. The socket 13 is offset upwardly relative to the shank 10, as indicated by the shoulder 16, so that when the car-coupler is low relative to the locomotive-coupler the intermediate coupler may be turned bottom upward, thereby lowering the socket of the intermediate coupler a distance equal to the height of the shoulder 16.

When the original coupler-head is pivoted to the original socket, the socket limits the motion of the coupler-head, said motion being equal to the distance between the line 17 and the line 18. The line 17 represents the straight line of draft, and the line 18 represents the limit of motion on each side of the line of draft. In the ordinary construction the distance between the lines 17 and 18 on the transverse line 19 is two and one-half inches. When the intermediate coupler is used, the intermediate coupler moves the same distance as the coupler-head—that is, to the line 18— and the coupler-head, which is now pivoted to the intermediate coupler, moves to the line 20, and the distance from the line 20 to the line 17 on the line 21 is approximately eight and three-fourths inches. Thus it will be seen that by the use of my intermediate coupler the total swing of the coupler-head is increased from five inches to seventeen and one-half inches and that by this means the locomotive may be coupled to a car upon a very sharp curve, or a car may be drawn around a very sharp turn without danger of derailing the car or breaking the wheel-flanges or causing other damage.

I claim—

1. The combination with a socket and a coupler-head adapted to be pivotally mounted in the socket; of an intermediate coupler adapted to be pivotally mounted in the said socket upon the removal of the coupler-head therefrom, and adapted to pivotally mount the coupler-head; substantially as specified.

2. The combination, with the usual socket and coupler-head, of an intermediate coupler adapted to be inserted between the coupler-head and the socket to increase the lateral motion of the coupler-head; substantially as specified.

3. The combination with the usual socket and coupler-head, of an intermediate coupler adapted to be inserted between the socket and the coupler-head to increase the lateral motion of the coupler-head; said intermediate coupler being offset so as to change the height of the coupler-head by reversing the intermediate coupler; substantially as specified.

In testimony whereof I affix my signature in presence of two witnesses.

WILLIAM C. WILSON.

Witnesses:
ALFRED A. EICKS,
M. G. IRION.